US008645767B2

(12) United States Patent
Craddock et al.

(10) Patent No.: US 8,645,767 B2
(45) Date of Patent: Feb. 4, 2014

(54) SCALABLE I/O ADAPTER FUNCTION LEVEL ERROR DETECTION, ISOLATION, AND REPORTING

(75) Inventors: David F. Craddock, New Paltz, NY (US); Thomas A. Gregg, Highland, NY (US); Eric N. Lais, Tillson, NY (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/821,247

(22) Filed: Jun. 23, 2010

(65) Prior Publication Data
US 2011/0320887 A1    Dec. 29, 2011

(51) Int. Cl.
*G06F 11/00*    (2006.01)

(52) U.S. Cl.
USPC ............................................ 714/43; 714/5.11

(58) Field of Classification Search
None
See application file for complete search history.

(56) References Cited

U.S. PATENT DOCUMENTS

| | | |
|---|---|---|
| 4,104,539 A | 8/1978 | Hase |
| 4,611,319 A | 9/1986 | Naito |
| 4,644,443 A | 2/1987 | Swensen et al. |
| 5,027,254 A | 6/1991 | Corfits et al. |
| 5,170,472 A | 12/1992 | Cwiakala et al. |
| 5,282,274 A | 1/1994 | Liu |
| 5,430,856 A | 7/1995 | Kinoshita |
| 5,438,575 A | 8/1995 | Bertrand |
| 5,465,332 A | 11/1995 | Deloye et al. |
| 5,465,355 A | 11/1995 | Cook et al. |
| 5,535,352 A | 7/1996 | Bridges et al. |
| 5,551,013 A | 8/1996 | Beausoleil et al. |
| 5,568,365 A | 10/1996 | Hahn et al. |
| 5,574,873 A | 11/1996 | Davidian |
| 5,600,805 A | 2/1997 | Fredericks et al. |
| 5,617,554 A | 4/1997 | Alpert et al. |
| 5,663,919 A | 9/1997 | Shirley et al. |
| 5,719,647 A | 2/1998 | Fujikawa et al. |
| 5,742,785 A | 4/1998 | Stone et al. |
| 5,761,448 A | 6/1998 | Adamson et al. |
| 5,790,825 A | 8/1998 | Traut |
| 5,815,647 A | 9/1998 | Buckland et al. |
| 5,838,960 A | 11/1998 | Harriman, Jr. |
| 5,870,598 A | 2/1999 | White et al. |
| 5,949,646 A | 9/1999 | Lee et al. |

(Continued)

FOREIGN PATENT DOCUMENTS

CN    1885096 A    12/2006
CN    101196615 A    6/2008

(Continued)

OTHER PUBLICATIONS

Final Office Action mail date Jun. 15, 2011 for U.S. Appl. No. 12/821,221.

(Continued)

*Primary Examiner* — Christopher McCarthy
(74) *Attorney, Agent, or Firm* — Cantor Colburn LLP; Steven Chiu

(57) ABSTRACT

Embodiments of the invention relate to scalable input/output (I/O) function level error detection, isolation, and reporting. An error is detected in a communication initiated between a function and the system memory, the communication including an I/O request from an application. Future communication between the function and the system memory is prevented in response to the detecting. The application is notified that the error in communication occurred in response to the detecting.

18 Claims, 6 Drawing Sheets

(56) References Cited

U.S. PATENT DOCUMENTS

| | | | |
|---|---|---|---|
| 5,960,213 | A | 9/1999 | Wilson |
| 5,963,425 | A | 10/1999 | Chrysler et al. |
| 6,009,261 | A | 12/1999 | Scalzi et al. |
| 6,023,736 | A | 2/2000 | Lambeth et al. |
| 6,067,595 | A | 5/2000 | Lindenstruth |
| 6,112,311 | A | 8/2000 | Beardsley et al. |
| 6,205,530 | B1 | 3/2001 | Kang |
| 6,233,693 | B1 | 5/2001 | Berglund et al. |
| 6,301,133 | B1 | 10/2001 | Cuadra et al. |
| 6,308,255 | B1 | 10/2001 | Gorishek, IV et al. |
| 6,330,656 | B1 | 12/2001 | Bealkowski et al. |
| 6,341,064 | B1 | 1/2002 | Bradley |
| 6,349,380 | B1 | 2/2002 | Shahidzadeh et al. |
| 6,362,942 | B2 | 3/2002 | Drapkin et al. |
| 6,408,347 | B1 | 6/2002 | Smith et al. |
| 6,456,498 | B1 | 9/2002 | Larson et al. |
| 6,463,582 | B1 | 10/2002 | Lethin et al. |
| 6,519,645 | B2 | 2/2003 | Markos et al. |
| 6,523,140 | B1 * | 2/2003 | Arndt et al. ............... 714/44 |
| 6,529,978 | B1 | 3/2003 | Eide et al. |
| 6,538,881 | B1 | 3/2003 | Jeakins et al. |
| 6,544,311 | B1 | 4/2003 | Walton et al. |
| 6,578,191 | B1 | 6/2003 | Boehme et al. |
| 6,594,148 | B1 | 7/2003 | Nguyen et al. |
| 6,595,018 | B2 | 7/2003 | Goth et al. |
| 6,615,305 | B1 | 9/2003 | Olesen et al. |
| 6,625,169 | B1 | 9/2003 | Tofano |
| 6,625,648 | B1 | 9/2003 | Schwaller et al. |
| 6,643,727 | B1 | 11/2003 | Arndt et al. |
| 6,654,818 | B1 | 11/2003 | Thurber |
| 6,658,599 | B1 * | 12/2003 | Linam et al. ............... 714/25 |
| 6,704,831 | B1 | 3/2004 | Avery |
| 6,721,813 | B2 | 4/2004 | Owen et al. |
| 6,721,839 | B1 | 4/2004 | Bauman et al. |
| 6,772,264 | B1 | 8/2004 | Dayan et al. |
| 6,816,590 | B2 | 11/2004 | Pike et al. |
| 6,845,428 | B1 | 1/2005 | Kedem |
| 6,845,469 | B2 | 1/2005 | Hicks et al. |
| 6,901,537 | B2 | 5/2005 | Dawkins et al. |
| 6,907,510 | B2 | 6/2005 | Bennett et al. |
| 6,927,975 | B2 | 8/2005 | Crippen et al. |
| 6,950,438 | B1 | 9/2005 | Owen et al. |
| 6,963,940 | B1 | 11/2005 | Glassen et al. |
| 6,970,992 | B2 | 11/2005 | Gurumoorthy et al. |
| 6,973,510 | B2 | 12/2005 | Arndt et al. |
| 6,978,338 | B2 | 12/2005 | Wang et al. |
| 6,996,638 | B2 | 2/2006 | Brice, Jr. et al. |
| 7,003,615 | B2 | 2/2006 | Chiu et al. |
| 7,004,233 | B2 | 2/2006 | Hasegawa et al. |
| 7,007,099 | B1 | 2/2006 | Donati et al. |
| 7,032,052 | B2 | 4/2006 | Sauber et al. |
| 7,042,734 | B2 | 5/2006 | Hensley et al. |
| 7,053,502 | B2 | 5/2006 | Aihara et al. |
| 7,062,594 | B1 | 6/2006 | Sardella et al. |
| 7,065,598 | B2 | 6/2006 | Connor et al. |
| 7,075,788 | B2 | 7/2006 | Larson et al. |
| 7,093,155 | B2 * | 8/2006 | Aoki ............... 714/4.11 |
| 7,096,308 | B2 | 8/2006 | Main et al. |
| 7,103,808 | B2 | 9/2006 | Kitamorn et al. |
| 7,107,331 | B2 | 9/2006 | Gava et al. |
| 7,107,384 | B1 | 9/2006 | Chen et al. |
| 7,107,495 | B2 | 9/2006 | Kitamorn et al. |
| 7,127,599 | B2 | 10/2006 | Brice, Jr. et al. |
| 7,130,938 | B2 | 10/2006 | Brice, Jr. et al. |
| 7,134,040 | B2 | 11/2006 | Ayres |
| 7,139,940 | B2 | 11/2006 | Arbeitman et al. |
| 7,152,136 | B1 | 12/2006 | Charagulla |
| 7,163,546 | B2 | 1/2007 | Mirizzi et al. |
| 7,174,550 | B2 | 2/2007 | Brice, Jr. et al. |
| 7,177,961 | B2 | 2/2007 | Brice, Jr. et al. |
| 7,200,704 | B2 | 4/2007 | Njoku et al. |
| 7,206,946 | B2 | 4/2007 | Sakakibara et al. |
| 7,209,994 | B1 | 4/2007 | Klaiber et al. |
| 7,219,181 | B2 | 5/2007 | Carty |
| 7,260,620 | B1 | 8/2007 | Halasz |
| 7,260,664 | B2 | 8/2007 | Arndt et al. |
| 7,277,968 | B2 | 10/2007 | Brice, Jr. et al. |
| 7,293,204 | B2 | 11/2007 | Lu |
| 7,296,120 | B2 | 11/2007 | Corrigan et al. |
| 7,302,692 | B2 | 11/2007 | Bae et al. |
| 7,313,643 | B2 | 12/2007 | Sakurai et al. |
| 7,334,107 | B2 | 2/2008 | Schoinas et al. |
| 7,340,582 | B2 | 3/2008 | Madukkarumukumana et al. |
| 7,370,224 | B1 | 5/2008 | Jaswa et al. |
| 7,380,041 | B2 | 5/2008 | Belmar et al. |
| 7,398,343 | B1 | 7/2008 | Marmash et al. |
| 7,412,488 | B2 | 8/2008 | Jha et al. |
| 7,418,572 | B2 | 8/2008 | Hepkin |
| 7,420,831 | B2 | 9/2008 | Seo et al. |
| 7,444,493 | B2 | 10/2008 | Schoinas et al. |
| 7,454,548 | B2 | 11/2008 | Belmar et al. |
| 7,457,900 | B2 | 11/2008 | Panesar |
| 7,464,174 | B1 | 12/2008 | Ngai |
| 7,474,623 | B2 | 1/2009 | Boyd et al. |
| 7,475,183 | B2 | 1/2009 | Traut et al. |
| 7,478,167 | B2 | 1/2009 | Ould-Brahim et al. |
| 7,480,303 | B1 | 1/2009 | Ngai |
| 7,493,425 | B2 | 2/2009 | Arndt et al. |
| 7,496,045 | B2 | 2/2009 | Boyd et al. |
| 7,496,707 | B2 | 2/2009 | Freking et al. |
| 7,506,087 | B2 | 3/2009 | Ho et al. |
| 7,519,647 | B2 | 4/2009 | Carlough et al. |
| 7,525,957 | B2 | 4/2009 | Scherer et al. |
| 7,529,860 | B2 | 5/2009 | Freimuth et al. |
| 7,530,071 | B2 | 5/2009 | Billau et al. |
| 7,535,828 | B2 | 5/2009 | Raszuk et al. |
| 7,546,386 | B2 | 6/2009 | Arndt et al. |
| 7,546,406 | B2 | 6/2009 | Armstrong et al. |
| 7,546,487 | B2 | 6/2009 | Marisetty et al. |
| 7,549,090 | B2 | 6/2009 | Bailey et al. |
| 7,552,298 | B2 | 6/2009 | Bestler |
| 7,558,348 | B1 | 7/2009 | Liu et al. |
| 7,562,366 | B2 | 7/2009 | Pope et al. |
| 7,565,463 | B2 | 7/2009 | Johnsen et al. |
| 7,567,567 | B2 | 7/2009 | Muller et al. |
| 7,587,531 | B2 | 9/2009 | Brice, Jr. et al. |
| 7,594,144 | B2 * | 9/2009 | Brandyberry et al. ............... 714/43 |
| 7,600,053 | B2 | 10/2009 | Carlson et al. |
| 7,606,965 | B2 | 10/2009 | Njoku et al. |
| 7,613,847 | B2 | 11/2009 | Kjos et al. |
| 7,617,340 | B2 | 11/2009 | Gregg |
| 7,617,345 | B2 | 11/2009 | Clark et al. |
| 7,624,235 | B2 | 11/2009 | Wadhawan et al. |
| 7,627,723 | B1 | 12/2009 | Buck et al. |
| 7,631,097 | B2 | 12/2009 | Moch et al. |
| 7,660,912 | B2 | 2/2010 | Gregg |
| 7,676,617 | B2 | 3/2010 | Kloeppner |
| 7,729,316 | B2 | 6/2010 | Uhlik |
| 7,836,254 | B2 | 11/2010 | Gregg et al. |
| 7,873,851 | B1 | 1/2011 | Linnell et al. |
| 7,975,076 | B2 | 7/2011 | Moriki et al. |
| 8,032,684 | B2 | 10/2011 | Pettey et al. |
| 8,041,811 | B2 | 10/2011 | Calippe et al. |
| 8,046,627 | B2 | 10/2011 | Takubo |
| 8,082,466 | B2 | 12/2011 | Tanaka et al. |
| 8,140,917 | B2 | 3/2012 | Suetsugu et al. |
| 2002/0112067 | A1 | 8/2002 | Chang et al. |
| 2002/0124211 | A1 | 9/2002 | Gray et al. |
| 2003/0056155 | A1 | 3/2003 | Austen et al. |
| 2003/0058618 | A1 | 3/2003 | Soetemans et al. |
| 2003/0093604 | A1 | 5/2003 | Lee |
| 2003/0097503 | A1 | 5/2003 | Huckins |
| 2003/0177221 | A1 | 9/2003 | Ould-Brahim et al. |
| 2003/0198180 | A1 | 10/2003 | Cambron |
| 2003/0200477 | A1 | 10/2003 | Ayres |
| 2004/0024905 | A1 | 2/2004 | Liao et al. |
| 2004/0088604 | A1 | 5/2004 | Bland et al. |
| 2004/0117534 | A1 | 6/2004 | Parry et al. |
| 2004/0130868 | A1 | 7/2004 | Schwartz et al. |
| 2004/0133819 | A1 | 7/2004 | Krishnamurthy et al. |
| 2004/0136130 | A1 | 7/2004 | Wimmer et al. |
| 2004/0199700 | A1 | 10/2004 | Clayton |
| 2005/0024187 | A1 | 2/2005 | Kranz et al. |
| 2005/0033895 | A1 | 2/2005 | Lueck et al. |

(56) References Cited

U.S. PATENT DOCUMENTS

| | | |
|---|---|---|
| 2005/0071472 A1 | 3/2005 | Arndt et al. |
| 2005/0091438 A1 | 4/2005 | Chatterjee |
| 2005/0116546 A1 | 6/2005 | Zeighami et al. |
| 2005/0144533 A1 | 6/2005 | LeVangia et al. |
| 2005/0146855 A1 | 7/2005 | Brehm et al. |
| 2005/0160214 A1 | 7/2005 | Sauber et al. |
| 2005/0162830 A1 | 7/2005 | Wortman et al. |
| 2005/0182862 A1 | 8/2005 | Ritz et al. |
| 2005/0213513 A1 | 9/2005 | Ngo et al. |
| 2005/0276017 A1 | 12/2005 | Aziz et al. |
| 2005/0286187 A1 | 12/2005 | Liu et al. |
| 2005/0289271 A1 | 12/2005 | Martinez et al. |
| 2005/0289278 A1 | 12/2005 | Tan et al. |
| 2006/0053339 A1 | 3/2006 | Miller et al. |
| 2006/0067069 A1 | 3/2006 | Heard et al. |
| 2006/0085150 A1 | 4/2006 | Gorin |
| 2006/0085573 A1 | 4/2006 | Pike et al. |
| 2006/0087813 A1 | 4/2006 | Becker et al. |
| 2006/0087814 A1 | 4/2006 | Brandon et al. |
| 2006/0095607 A1 | 5/2006 | Lim et al. |
| 2006/0195644 A1 | 8/2006 | Arndt et al. |
| 2006/0206639 A1 | 9/2006 | Tee et al. |
| 2006/0230208 A1 | 10/2006 | Gregg et al. |
| 2006/0236054 A1 | 10/2006 | Kitamura |
| 2006/0253619 A1 | 11/2006 | Torudbakken et al. |
| 2006/0271718 A1 | 11/2006 | DiPlacido |
| 2006/0288130 A1 | 12/2006 | Madukkarumukumana et al. |
| 2006/0291447 A1 | 12/2006 | Siliquini et al. |
| 2007/0008663 A1 | 1/2007 | Nakashima et al. |
| 2007/0069585 A1 | 3/2007 | Bosco et al. |
| 2007/0073955 A1 | 3/2007 | Murray et al. |
| 2007/0078996 A1 | 4/2007 | Chen et al. |
| 2007/0115230 A1 | 5/2007 | Tajiri et al. |
| 2007/0136554 A1 | 6/2007 | Biran et al. |
| 2007/0168636 A1 | 7/2007 | Hummel et al. |
| 2007/0183393 A1 | 8/2007 | Boyd et al. |
| 2007/0186074 A1 | 8/2007 | Bradford et al. |
| 2007/0211430 A1 | 9/2007 | Bechtolsheim |
| 2007/0226386 A1 | 9/2007 | Sharp et al. |
| 2007/0226523 A1 | 9/2007 | Chang |
| 2007/0234018 A1 | 10/2007 | Feiste |
| 2007/0239925 A1 | 10/2007 | Koishi |
| 2007/0245041 A1 | 10/2007 | Hua et al. |
| 2007/0262891 A1 | 11/2007 | Woodral et al. |
| 2007/0271559 A1 | 11/2007 | Easton et al. |
| 2007/0273018 A1 | 11/2007 | Onozuka et al. |
| 2007/0274039 A1 | 11/2007 | Hamlin |
| 2008/0043405 A1 | 2/2008 | Lee et al. |
| 2008/0065796 A1 | 3/2008 | Lee et al. |
| 2008/0068141 A1 | 3/2008 | Bonaguro et al. |
| 2008/0077817 A1 | 3/2008 | Brundridge |
| 2008/0091851 A1 | 4/2008 | Sierra |
| 2008/0091868 A1 | 4/2008 | Mizrachi et al. |
| 2008/0091915 A1 | 4/2008 | Moertl et al. |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0147943 A1 | 6/2008 | Freimuth et al. |
| 2008/0148295 A1 | 6/2008 | Freimuth et al. |
| 2008/0162865 A1 | 7/2008 | Koufaty et al. |
| 2008/0168208 A1 | 7/2008 | Gregg |
| 2008/0189577 A1 | 8/2008 | Arndt et al. |
| 2008/0192431 A1 | 8/2008 | Bechtolsheim |
| 2008/0209114 A1 | 8/2008 | Chow et al. |
| 2008/0222406 A1 | 9/2008 | Tabuchi |
| 2008/0235425 A1 | 9/2008 | Belmar et al. |
| 2008/0239687 A1 | 10/2008 | Leigh et al. |
| 2008/0239945 A1 | 10/2008 | Gregg |
| 2008/0244146 A1 | 10/2008 | Das et al. |
| 2008/0259555 A1 | 10/2008 | Bechtolsheim et al. |
| 2008/0263246 A1 | 10/2008 | Larson et al. |
| 2008/0270853 A1* | 10/2008 | Chagoly et al. .................. 714/49 |
| 2008/0288661 A1 | 11/2008 | Galles |
| 2009/0037682 A1 | 2/2009 | Armstrong et al. |
| 2009/0070760 A1 | 3/2009 | Khatri et al. |
| 2009/0125666 A1 | 5/2009 | Freking et al. |
| 2009/0144462 A1 | 6/2009 | Arndt et al. |
| 2009/0144731 A1 | 6/2009 | Brown et al. |
| 2009/0182966 A1 | 7/2009 | Greiner et al. |
| 2009/0182969 A1 | 7/2009 | Norgaard et al. |
| 2009/0210527 A1 | 8/2009 | Kawato |
| 2009/0210646 A1 | 8/2009 | Bauman et al. |
| 2009/0222814 A1 | 9/2009 | Astrand |
| 2009/0234987 A1 | 9/2009 | Lee et al. |
| 2009/0240849 A1 | 9/2009 | Corneli et al. |
| 2009/0249039 A1 | 10/2009 | Hook et al. |
| 2009/0254692 A1 | 10/2009 | Feehrer |
| 2009/0276551 A1 | 11/2009 | Brown et al. |
| 2009/0276773 A1 | 11/2009 | Brown et al. |
| 2009/0276774 A1 | 11/2009 | Kinoshita |
| 2009/0328035 A1 | 12/2009 | Ganguly |
| 2010/0002755 A1 | 1/2010 | Heidari et al. |
| 2010/0005234 A1 | 1/2010 | Ganga et al. |
| 2010/0005531 A1 | 1/2010 | Largman et al. |
| 2010/0027559 A1 | 2/2010 | Lin et al. |
| 2010/0042999 A1 | 2/2010 | Dorai et al. |
| 2010/0077117 A1 | 3/2010 | Asnaashari |
| 2010/0115329 A1 | 5/2010 | Tanaka et al. |
| 2010/0131359 A1 | 5/2010 | Ting et al. |
| 2010/0146089 A1 | 6/2010 | Freimuth et al. |
| 2010/0157463 A1 | 6/2010 | Arizono et al. |
| 2010/0169674 A1 | 7/2010 | Kazama |
| 2010/0205608 A1 | 8/2010 | Nemirovsky et al. |
| 2010/0211714 A1 | 8/2010 | Lepage |
| 2010/0287209 A1 | 11/2010 | Hauser |
| 2010/0312894 A1 | 12/2010 | Awad et al. |
| 2011/0029696 A1 | 2/2011 | Uehara |
| 2011/0029734 A1 | 2/2011 | Pope et al. |
| 2011/0131359 A1 | 6/2011 | Pettey et al. |
| 2011/0219161 A1 | 9/2011 | Deshpande et al. |
| 2011/0258352 A1 | 10/2011 | Williams et al. |
| 2011/0265134 A1 | 10/2011 | Jaggi et al. |
| 2011/0317351 A1 | 12/2011 | Pizzolato et al. |
| 2011/0317743 A1 | 12/2011 | Decusatis et al. |
| 2011/0320602 A1 | 12/2011 | Carlson et al. |
| 2011/0320653 A1 | 12/2011 | Lais et al. |
| 2011/0320666 A1 | 12/2011 | Gregg et al. |
| 2011/0320670 A1 | 12/2011 | Bayer et al. |
| 2011/0320674 A1 | 12/2011 | Gregg et al. |
| 2011/0320675 A1 | 12/2011 | Gregg et al. |
| 2011/0320703 A1 | 12/2011 | Craddock et al. |
| 2011/0320796 A1 | 12/2011 | DeCusatis et al. |
| 2011/0320861 A1 | 12/2011 | Bayer et al. |
| 2011/0320892 A1 | 12/2011 | Check et al. |

FOREIGN PATENT DOCUMENTS

| | | |
|---|---|---|
| CN | 101571631 A | 11/2009 |
| CN | 102193239 A | 9/2011 |
| JP | 57191826 | 11/1982 |
| JP | 5981724 | 5/1984 |
| JP | 6279557 | 4/1987 |
| JP | 0553973 | 3/1993 |
| JP | 2007087082 A | 4/2007 |
| JP | 2007241526 A | 9/2007 |
| JP | 2010134627 A | 6/2010 |
| WO | WO9600940 | 11/1996 |
| WO | 2009027189 A1 | 3/2008 |

OTHER PUBLICATIONS

U.S. Appl. No. 12/821,221, filed Jun. 23, 2010.
U.S. Appl. No. 12/821,222, filed Jun. 23, 2010.
U.S. Appl. No. 12/821,224, filed Jun. 23, 2010.
U.S. Appl. No. 12/821,226, filed Jun. 23, 2010.
U.S. Appl. No. 12/821,239, filed Jun. 23, 2010.
U.S. Appl. No. 12/821,242, filed Jun. 23, 2010.
U.S. Appl. No. 12/821,243, filed Jun. 23, 2010.
U.S. Appl. No. 12,821,245, filed Jun. 23, 2010.
U.S. Appl. No. 12/821,248, filed Jun. 23, 2010.
U.S. Appl. No. 12/821,250, filed Jun. 23, 2010.
U.S. Appl. No. 12/821,256, filed Jun. 23, 2010.
U.S. Appl. No. 12/821,271, filed Jun. 23, 2010.

(56) References Cited

OTHER PUBLICATIONS

Baumann, Andrew, et al., "The Multikernel: A New OS Architecture for Scalable Multicore Systems," Oct. 2009, SOSP'09, Oct. 11-14, 2009, Big Sky, Montana, USA, pp. 29-43.

Crawford et al. "Accelerating Computing with the Cell Broadband Engine Processor"; CF'08, May 5-7, 2008; Ischia, Italy; Copyright 2008 ACM 978-1-60558-077.

Darren Abramson et al.; "Intel Virtualization Technology for Directed I/O"; Intel Technology Journal, vol. 10, Issue 3, Aug. 10, 2006; pp. 1-16.

Huang, Wei et al., "A Case for High Performance Computing with Virtual Machines," ISC '06, Jun. 3, 28, 30, Carins, Queensland, Australia, pp. 125-134, Jun. 3, 2006.

"Intel (registered trademark) Itanium (registered trademark) Architecture Software Developer's Manual," vol. 2, Rev. 2.2, Jan. 2006.

"z/VM: General Information Manual," IBM Publication No. GC24-5991-05, May 2003.

"DMA Engines Bring Mulicast to PCI Express Systems," http://electronicdesign.com, Aug. 13, 2009, 3 pages.

"I/O Virtualization and AMD's IOMMU," AMD Developer Central, http://developer.amd.com/documentation/articles/pages.892006101.aspx, Aug. 9, 2006.

"IBM Enhances the IBM eServer zSeries 990 Family of Servers," Hardware Announcement, Oct. 7, 2003, pp. 1-11.

Internet Article, "Large Page Support in the Lunux Kernel," http://lwn.net./Articles/6969/<retrieved on Jan. 26, 2010>.

K. Vaidyanathan et al.; "Exploiting RDMA Operations for Providing Efficient Fine-Grained Resource Monitoring in Cluster-Based Servers"; Jun. 2006; pp. 10; Downloaded: Apr. 13, 2010 at 18:53:46 UTC from IEEE Xplore. 1-4244-0328-6/06.

Mysore, Shashidhar et al., "Understanding and Visualizing Full Systems with Data Flow Tomography" SPOLOS '08, Mar. 1-5, 2008, Seattle, Washington, USA, pp. 211-221.

Narayanan Ganapathy et al.; Papers-USENIX Annual Teleconference (No. 98); Entitled: "General Purpose Operating System Support for Multiple Page Sizes" 1998; pp. 1-9.

U.S. Appl. No. 12/821,221, Non-Final Office Action mail date Jan. 10, 2011.

Paulsen, Erik; "Local Memory Coaxes Top Speed from SCSI Masters"; Electronic Design, v. 41, (Apr. 15, 1993) p. 75-6+.

Swift, Micael M. et al., "Improving the Reliability of Commodity Operating Systems," ACM Transactions on Computer Systems, vol. 23, No. 1, Feb. 2005, pp. 77-110.

Talluri et al., "A New Page Table for 64-bit Address Spaces," ACM SIGOPS Operating Systems Review, vol. 29, Issue 5 (Dec. 1995), pp. 194-200.

VTdHowTo—Xen Wiki; Downloaded—Apr. 16, 2010; pp. 1- 5; http://wiki.xensource.com/xenwik/VTdHowTo.

Winwood, Simon, et al., "Multiple Page Size Support in the Linux Kernel", Proceedings of Ottawa Linux Symposium, 2002.

Xu, Min et al., "Towards a VMM-based Usage Control Framework for OS Kernel Integrity Protection," SACMAT '07, Jun. 20-22, 2007, Sophia Antipolis, France, pp. 71-80.

z/Architecture Principles of Operation, Feb. 2009; pp. 1-1344.

z/VM: Running Guest Operating Systems, IBM Publication No. SC24-5997-02, Oct. 2001.

Dolphin Interconnect Solutions; MySQL Acceleration Solutions; Solid State Storage; Embeded and HPC Solutions; "DXH510 PCI Express Host Adapter"; ww.dolphinics.com/products/pent-dxseries-dsh510.html downloaded Jun. 10, 2010.

J. Regula, "Using Non-transparent Bridging in PCI Express Systems", PLX Technology, Inc., pp. 1-31; Published: Jun. 1, 2004.

Jack Regula; "Ethernet Tunneling through PCI Express Inter-Processor Communication, Low Latency Storage IO Source"; www.wwpi.com; publisher: Computer Technology Review; Jan. 19, 2009.

Robert F. Kern, "IBM System z & DS8000 Technology Synergy", IBM ATS Americas Disk Storage; Jul. 21, 2009, pp. 1-25.

Szwed et al.; "Managing Connected PCI Express Root Complexes"; Dated: Dec. 23, 2009—6 pages.

U.S. Appl. No. 12/821,124, filed on Jun. 23, 2010, entitled "Automatic Construction of Human Interaction Proof Engines".

U.S. Appl. No. 12/821,181, filed on Jun. 23, 2010, entitled "Controlling the Selectively Setting of Operational Parameters for an Adapter".

U.S. Appl. No. 12/821,182, filed on Jun. 23, 2010, entitled "Load Instruction for Communicating With Adapters".

U.S. Appl. No. 12/821,185, filed on Jun. 23, 2010, entitled "Discovery by Operating System of Information Relating to Adapter Functions Accessible to the Operating System".

U.S. Appl. No. 12/821,191, filed on Jun. 23, 2010, entitled "Managing Processing Associated With Hardware Events".

International Search Report for PCT/EP2011/059810, Sep. 14, 2011, pp. 1-9.

Final Office Action Received Mar. 2, 2012 for U.S. Appl. No. 12/821,221, entitled "Server Drawer" pp. 1-21.

Non Final Office Action recieved May 8, 2012 for U.S. Appl. No. 12/821,243, entitled "Upbound Input/Output Expansion Request and Response Processing in a PCIE Architecture" pp. 1-37.

Non Final Office Action received Mar. 15, 2012 for U.S. Appl. No. 12/821,242, entitled "System and Method for Downbound I/O Expansion Request and Response Processing in a PCIe Architecture" pp. 1-32.

Non Final Office Action received May 4, 2012 for U.S. Appl. No. 12/821,256, entitled "Switch Failover Control in a Multiprocessor Computer System" pp. 1-46.

PCI Express Base Specification Rev 1.0a, Apr. 15, 2003 pp. 1-2, 31, 35, 36, 43, 44, 49-51, 55, 59, 62, 74, 101, (pp. 1-426 included).

Non Final Office Action received Jun. 5, 2012 for U.S. Appl. No. 12/821,221, entitled "Server Drawer" pp. 1-15.

Non-final Office Action received Feb. 16, 2012 for U.S. Appl. No. 12/821,250, entitled "Covery of Logical Images At Storage Area Network Endpoints" pp. 1-39.

Non-final office Action received for U.S. Appl. No. 12/821,239 dated Nov. 8, 2012.

Final Office Action dated Aug. 30, 2012 for U.S. Appl. No. 12/821,245.

Non-final Office Action dated Sep. 26, 2012 for U.S. Appl. No. 12/821,243.

Final Office Action dated Sep. 13, 2012 for U.S. Appl. No. 12/821,256.

Final Office Action received Oct. 10, 2012 for U.S. Appl. No. 12/821,221.

Notice of Allowance dated Sep. 19, 2012 for U.S. Appl. No. 12/821,224.

Final Office Action dated Jul. 19, 2012 for U.S. Appl. No. 12/821,250.

Final Office Action dated Jun. 14, 2013 for U.S. Appl. No. 12/821,239, 14 pages.

Informational Materials for IDS, date May 8, 2013, 4 pages.

International Search Report of the Patent Cooperation Treaty for International Application No. PCT/CN2013/070828, mailing date Apr. 24, 2013, 13 pages.

\* cited by examiner

SCALABLE I/O ADAPTER FUNCTION LEVEL ERROR DETECTION, ISOLATION, AND REPORTING

BACKGROUND

This invention relates generally to processor input/output (I/O) interfacing within a computing environment, and more particularly to scalable adapter level error detection, isolation, and reporting.

In enterprise class servers, there is a need to protect the integrity of data generated by adapters. There is also a need to provide isolation and reporting when errors are detected for these adapters. Typical solutions are either primitive, provide no isolation, do not protect the data or are complex and not scalable. This invention provides a robust, scalable solution that is simple to implement in hardware and/or software. Protocols, such as PCIe, that do not acknowledge certain operations (e.g. DMA Writes), leave data integrity exposures in the event of errors. Current systems either ignore the error or require complex hardware modifications in order to properly capture error conditions.

BRIEF SUMMARY

A system for implementing scalable input/output (I/O) function level error detection, isolation, and reporting, the system comprising, an I/O hub communicatively coupled to a computer processor, system memory and at least one I/O adapter, the at least one I/O adapter include a function and the I/O hub including logic for implementing a method. The method comprising detecting an error in a communication initiated between the function and the system memory, the communication including an I/O request from an application. The method further comprising preventing future communication between the one function and the system memory in response to the detecting. The method additionally comprising notifying the application that the error in communication occurred in response to the detecting.

A computer program product for implementing scalable I/O function level error detection, isolation, and reporting, the computer program product comprising a non-transitory storage medium readable by a processing circuit and storing instructions for execution by the processing circuit for performing a method. The method comprising detecting an error in a communication initiated between a function and the system memory, the communication including an I/O request from an application. The method further comprising preventing future communication between the function and the system memory in response to the detecting. The method additionally comprising notifying the application that the error in communication occurred in response to the detecting.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention provides for scalable PCIe function-level error, detection, and recovery.

In standard implementations of PCIe, the PCIe adapters have no mechanism for receiving acknowledgements of the successful completion of a direct memory access (DMA) Write operation. One example of such a request is software executing in memory which may make a request for data accessible over a PCIe adapter. A typical data read request, for example to a disk, involves multiple DMA writes to memory by the PCIe adapter, and this multi-transactional read is flagged as complete once the PCIe adapter has read all of the requested data from disk. In the event of an error in a multi-transaction function, such as the transaction described here, the PCIe adapter will continue sending data to the PCIe hub even if one of the transactions fails. Once the PCIe adapter completes storing the requested data into memory, the PCIe adapter will issue a status update indicating that the read operation has completed because it has no indication that one of the transactions has failed. A program executing in memory will read the indicator set by the adapter and will not detect that an error exists in the data. In an exemplary embodiment, a mechanism for the prevention of this type of error is presented herein.

Figure 1:
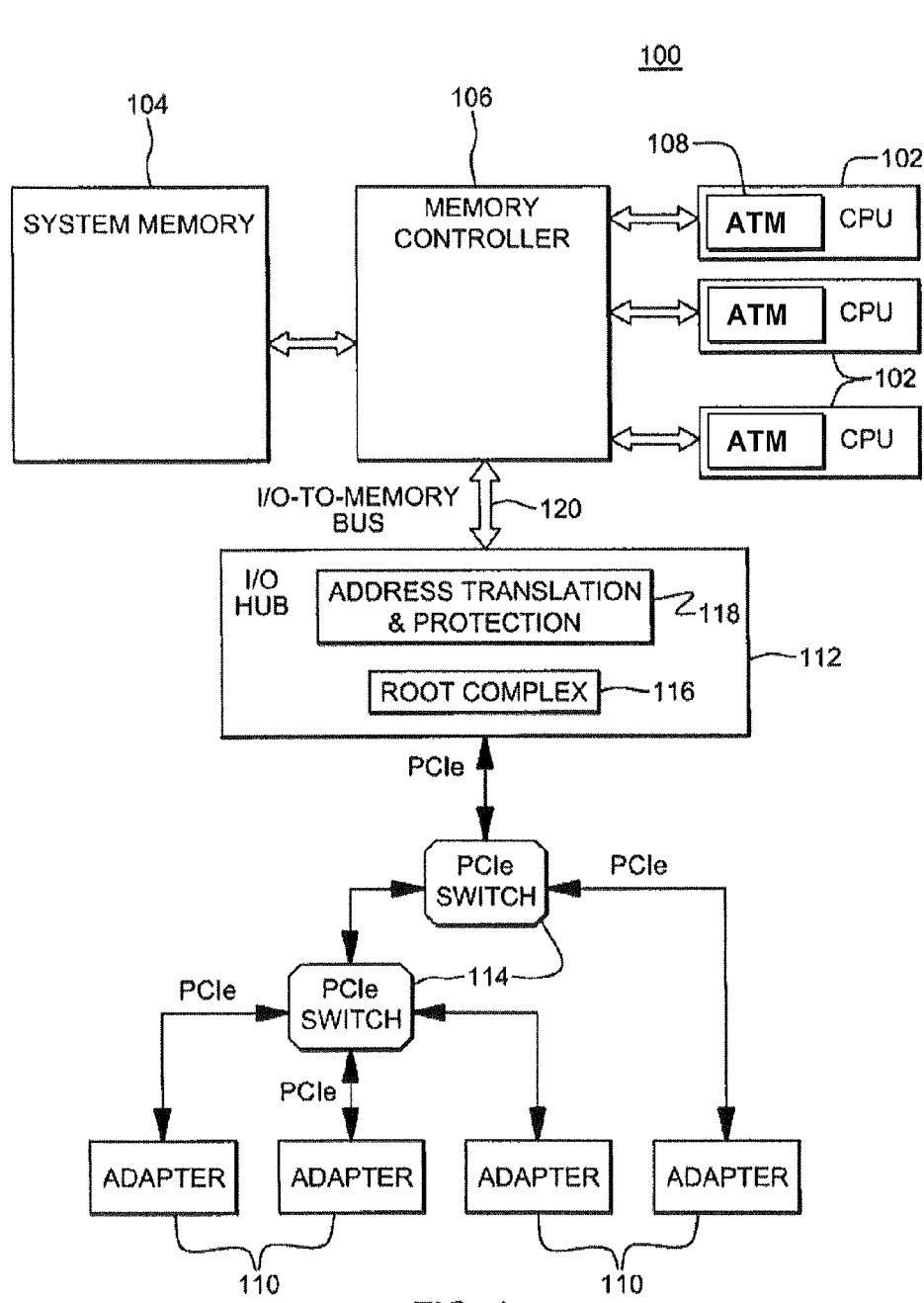
FIG. 1 depicts a block diagram of a computer system implementing PCIe adapters that may be implemented in an exemplary embodiment.

One exemplary embodiment of a computing environment to incorporate and use one or more aspects of the present invention is described with reference to FIG. 1. In one example, a computing environment 100 is a System Z® server offered by International Business Machines Corporation. System z is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety. IBM®, System z and z/Architecture are registered trademarks of International Business Machines Corporation, Armonk, N.Y. Other names used herein may be registered trademarks, trademarks or product names of International Business Machines Corporation or other companies.

In an exemplary embodiment, computing environment 100 includes one or more central processing units (CPUs) 102 or computer processors coupled to a system memory 104 via a memory controller 106. To access the system memory 104, one of the CPUs 102 issues a read or write request that includes an address used to access the system memory 104. The address included in the request is typically not directly usable to access the system memory 104, and therefore, it is translated to an address that is directly usable in accessing the system memory 104. The address is translated via an address translation mechanism (ATM) 108, as shown in FIG. 1. For example, the address may be translated from a virtual address to a real or absolute address using, for instance, dynamic address translation (DAT).

The request, including the translated address, is received by the memory controller 106. In an exemplary embodiment, the memory controller 106 is comprised of hardware and is used to arbitrate for access to the system memory 104 and to maintain the system memory's 104 consistency. This arbitration is performed for requests received from The CPUs 102, as well as for requests received from one or more adapters 110. Similar to the CPUs 102, the adapters 110 may issue requests to the system memory 104 to gain access to the system memory 104.

In an exemplary embodiment, adapter 110 is a Peripheral Component Interface (PCI) or PCI express (PCIe) adapter that performs one or more PCIe functions. A PCIe function issues a request that requires access to the system memory 104. The request is routed to an I/O hub 112 (e.g., a PCI hub) via one or more switches (e.g., PCIe switches) 114. In one exemplary embodiment, the I/O hub 112 is comprised of hardware, including one or more state machines, and logic circuits for performing scalable I/O adapter function level error detection, isolation and reporting.

The I/O hub 112 includes, for instance, a root complex 116 that receives the request from the switch 114. The request includes an input/output (I/O) address that may need to be translated, and thus, the root complex 116 provides the address to an address translation and protection unit (ATP Unit) 118. The ATP Unit 118 is, for instance, a hardware unit used to translate, if needed, the I/O address to an address directly usable to access the system memory 104, as described in further detail below.

The request initiated from one of the adapters 110, including the address (translated or initial address, if translation is not needed), is provided to the memory controller 106 via, for instance, an I/O-to-memory bus 120 (also referred to herein as an I/O bus). The memory controller 106 performs its arbitration and forwards the request with the address to the system memory 104 at the appropriate time.

Figure 2:
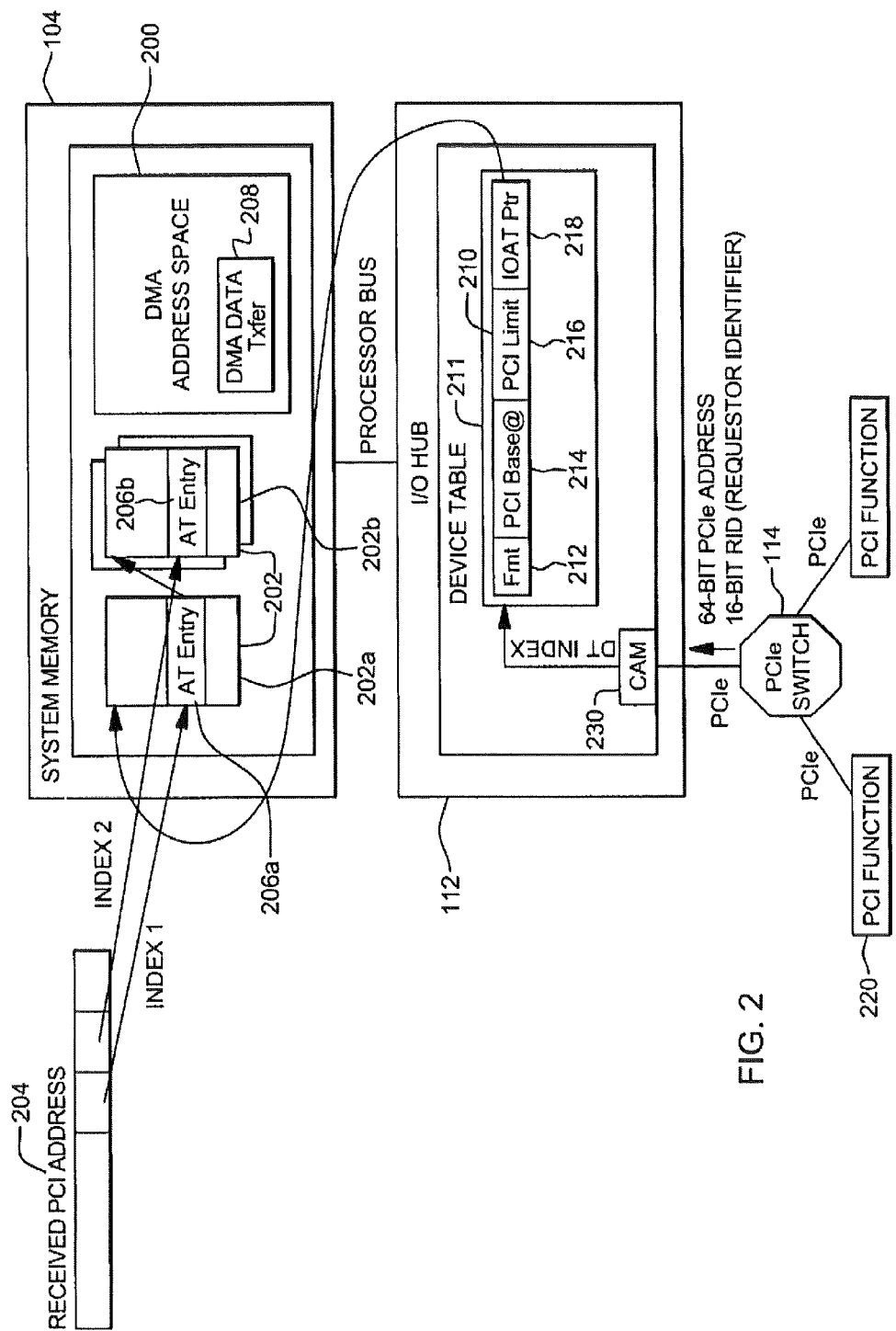
FIG. 2 depicts a block diagram of a scalable PCIe function level error detection, isolation, and reporting system that may be implemented by an exemplary embodiment.

Turning now to FIG. 2, exemplary components of the system memory 104 and the I/O hub 112 will now be described. In one exemplary embodiment, the system memory 104 includes one or more address spaces 200. The address space 200 refers to a particular portion of the system memory 104 that has been assigned to a particular component of the computing environment 100, such as one of the adapters 110. By way of non-limiting example, the address space 200 may be accessible by DMA initiated by one of the adapters 110 and, as shown in FIG. 2 for illustrative purposes, the address space 200 is referred to as a DMA address space 200.

In an exemplary embodiment, the system memory 104 includes address translation tables 202 used to translate an address from one that is not directly usable for accessing the system memory 104 to one that is directly usable. In one embodiment, there are one or more of the address translation tables 202 assigned to DMA address space 200, and the one or more address translation tables 202 may be configured based on, for instance, the size of the address space to which they are assigned, the size of the DMA address translation tables 202 themselves, and/or the size of the page (or other unit of memory) to be accessed.

In an exemplary embodiment, a hierarchy of DMA address translation tables 202 includes a first-level table 202*a* (e.g., a segment table) to which an input/output address translation pointer (IOAT ptr) 218 (described below) is directed, and a second, lower level table 202*b* (e.g., a page table) to which an entry of the first-level table 202*a* is pointed. One or more bits of a received PCIe address 204, which is received from one of the adapters 110, may be used to index into the table 202*a* to locate a particular entry 206*a*, which indicates the particular lower level table 202*b*. One or more other bits of PCIe address 204 may then be used to locate a particular entry 206*b* in the lower level table 202*b*. In this example, the entry 206*b* provides the address used to locate the correct page, and additional bits in the PCIe address 204 may be used to locate a particular location 208 in the page to perform a data transfer.

In one example, an operating system (not shown) may be configured to assign the DMA address space 200 to one of the adapters 110. This assignment may be performed via a registration process, which causes an initialization (via, e.g., trusted software) of a device table entry 210 for the adapter 110. The device table entry 210 may be located in a device table 211 which, in turn, is located in the I/O hub 112. In an exemplary embodiment, the device table 211 is located within the ATP Unit 118 (FIG. 1) of the I/O hub 112.

In an exemplary embodiment, device table entry 210 includes a number of fields, such as the following:

Format (FMT) 212: Indicates the format of an upper level table of the address translation tables 202 (e.g., in the example above, the first-level table 202*a*);

PCIe base address (PCI Base @) 214 and PCI limit 216: Provides a range used to define the DMA address space 200 and verify a received address (e.g., the PCIe address 204) is valid; and IOAT Ptr 218: Is a pointer to the highest level of one of the DMA address translation tables 202 (e.g. first level table 202*a*) used for the DMA address space 200.

In addition the device table entry 210 may contain information related to converting Message Signaled Interruptions (MSI) to interrupts that may be interpreted by the system (not shown).

In an exemplary embodiment, the device table entry 210 is located using a requestor identifier (RID) located in a request issued by a PCI function 220 associated with one of the adapters 110 (and/or by a portion of the address). The requestor identifier (e.g., a 16-bit value that includes a bus number, device number and function number) is included in the request, as well as the PCIe address 204 (e.g., a 64-bit PCIe address) to be used to access the system memory 104. The request, including the RID and I/O address, is provided to, e.g., a contents addressable memory (CAM) 230 via, e.g., the switch 114, which is used to provide an index value. The output of the CAM 230 is used to index into the device table 211 to locate the device table entry 210. In other embodiments, the CAM 230 or other look-up is not needed and the RID may be used as the index.

In an exemplary embodiment, fields within the device table entry 210 are used to ensure the validity of the PCIe address 204 and the configuration of the address translation tables 202. For example, the inbound address in the request is checked by the hardware of the I/O hub 112 to ensure that it is within the bounds defined by PCI base address 214 and the PCI limit 216 stored in the device table entry 210 located using the RID of the request that provided the address. This ensures that the address is within the range previously registered and for which the address translation tables 202 are validly configured.

Figure 3:
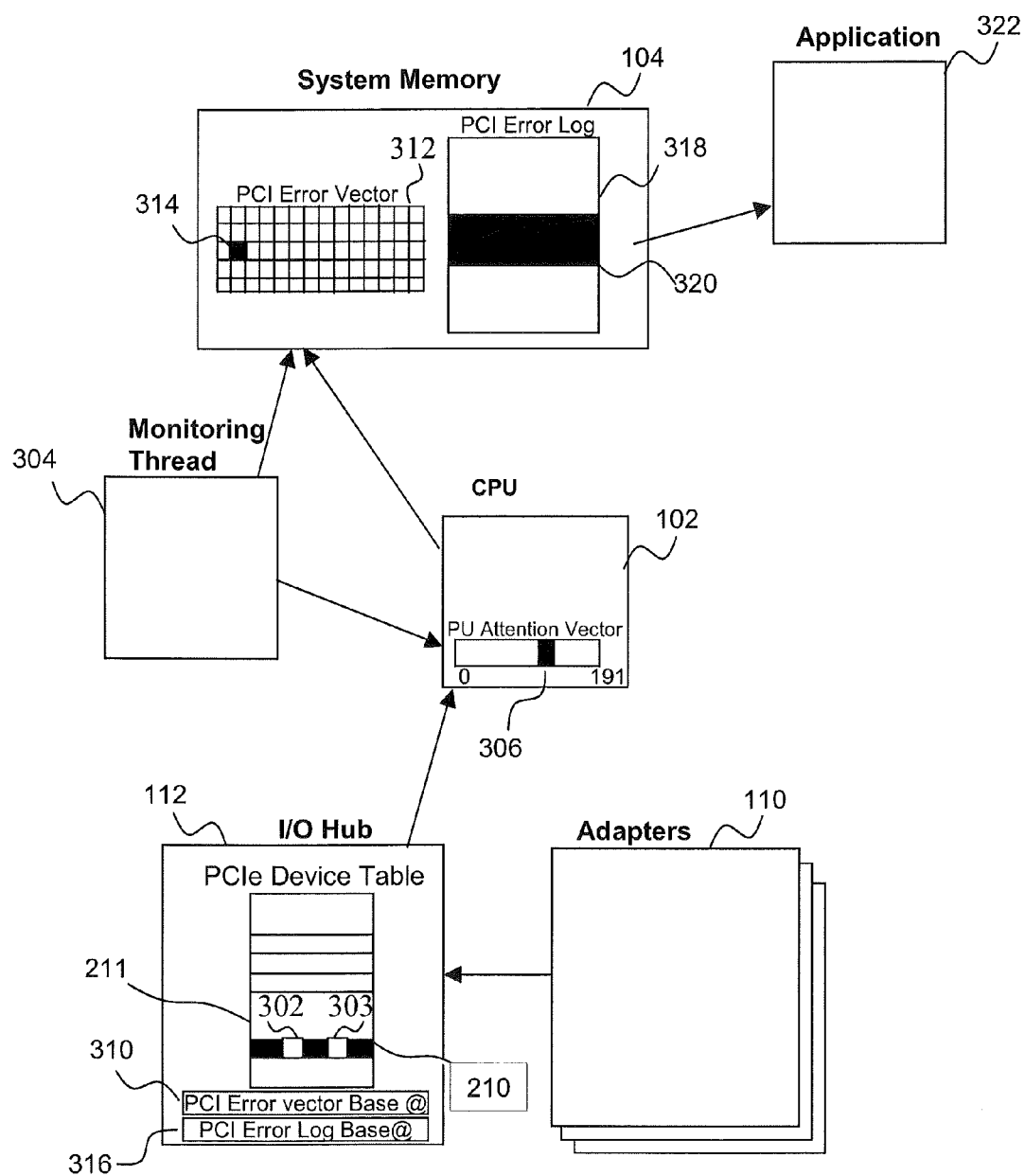
FIG. 3 depicts a more detailed block diagram of a scalable PCIe function level error detection, isolation, and reporting system that may be implemented by an exemplary embodiment.

Turning now to FIG. 3, a detailed block diagram of a scalable I/O adapter function level error detection, isolation, and reporting system will now be described in an exemplary embodiment. The adapters 110 may receive requests for access to attached resources in the computing environment from, for example, an application 322 which is executed by the CPU 102 and runs in application memory (not shown). The adapters 110 communicate with the CPUs 102 and may perform read and write operations to the system memory 104 through the I/O hub 112, as described above. The I/O hub 112 maintains the device table 211 which, in turn, contains the device table entries 210 comprised of fields as described above. In an exemplary embodiment the device table entry 210 further comprises an error identifier field 302 which is used by the I/O hub 112 to indicate an error as will be described in detail below. In the I/O hub 112 further comprises a PCI error vector base address 310 and a PCI error log base address 316 field for storing the base addresses within the system memory 104 of the starting location of a PCI error vector 312 and a PCI error log 318 respectively as will be discussed in more detail below. The CPU 102 includes an attention vector 306 used for setting and detecting interrupts which are triggered by the I/O hub 112 as will be described in more detail below. In an exemplary embodiment the system memory 104 further includes the PCI error log 318. The PCI error log 318 contains one or more PCI error log records 320 for logging the details of errors that occur at the adapters 110 as will be described in more detail below. The system memory 104 further contains the PCI error vector 312. In an exemplary embodiment the PCI error vector 312 contains a plurality of PCI error vector bits 314, with each bit representing one of the adapters 110 (or a PCI function within an adapter). Each of these bits also indicates that the I/O hub 112 has stored the PCI error log record 320 associated with this adapter 110. The PCI error vector bit 314 is set to flag an error with an adapter 110 as will be described in more detail below. The monitoring thread 304 may access the system memory 104 including the PCI error log 318 and the PCI error vector 312. In an exemplary embodiment a monitoring thread 304 executes on the CPU 102 and monitors the PCI error vector 312 and the attention vector 306. The monitoring thread 304 detects and propagates error signals as will be described in more detail below.

Although the adapters have been described as operating in a single operating system environment, it will be understood that in alternate embodiments of the present invention would also be applicable to environments in which there are multiple adapters each of which may be owned by a different operating system. The monitoring thread 304 is implemented by trusted firmware (not shown) such that individual operating systems are prevented from accessing the PCI error log 318 and PCI error vector 312 directly. This trusted firmware monitors the PCI error log 318 and the PCI error vector 312 and notifies the appropriate operating system when an adapter that it owns encounters an error.

Figure 4:
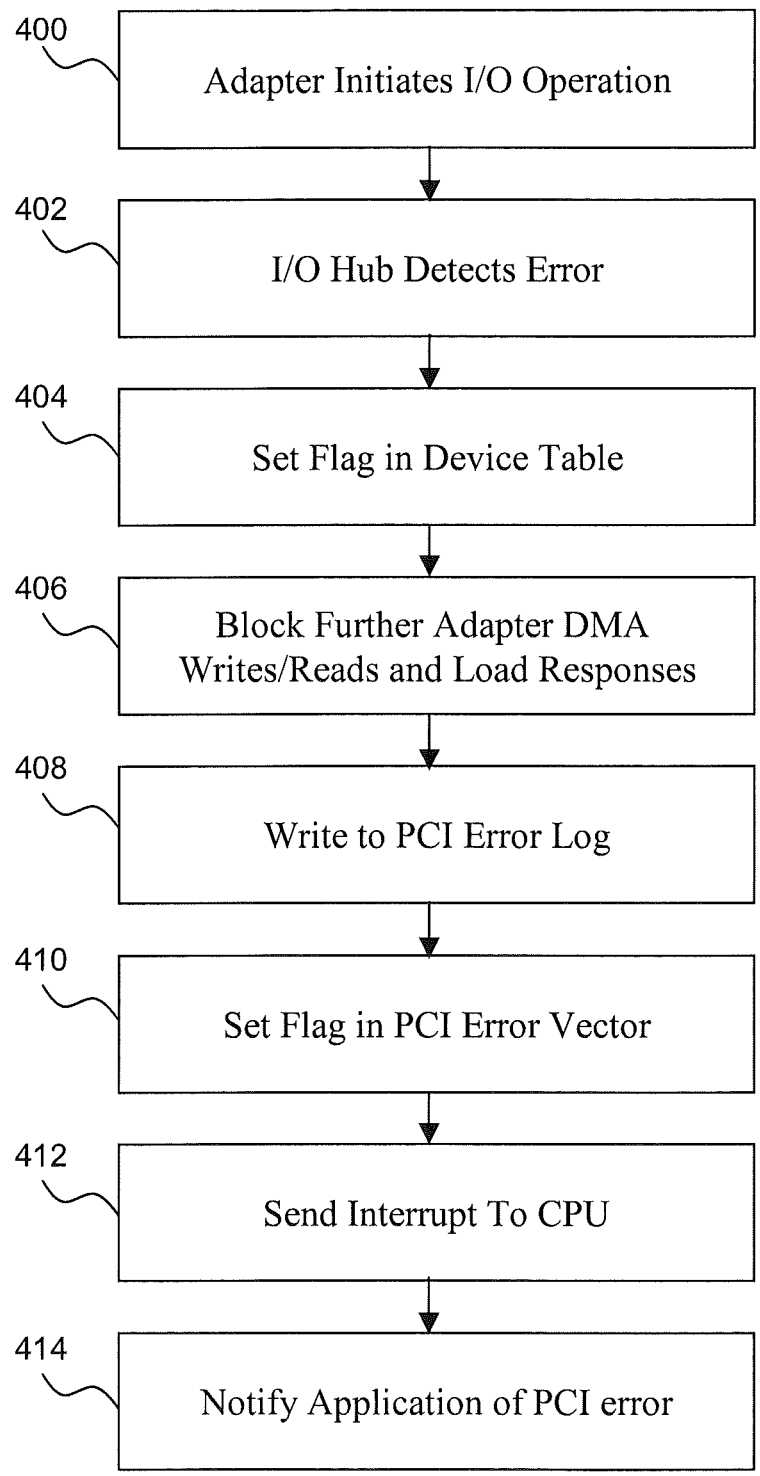
FIG. 4 depicts a process flow of a scalable PCIe function level error detection, isolation, and reporting process that may be implemented by an exemplary embodiment.

Turning now to FIG. 4 a flow diagram illustrating a process for implementing scalable I/O adapter function level error detection, isolation and reporting will now be described in an exemplary embodiment. At block 400, one of the adapters 110 initiates one or more read and/or write operations in response to receiving a request from the application 322. At block 402, the I/O hub 112 detects an error in a particular operation executed by the adapter 110 (e.g. the received PCI address is outside the range previously registered for the adapter). At block 404 the I/O hub 112 sets one or more flags (e.g. the error identifier fields 302, and 303) in the device table 211 indicating that the adapter 110 has entered an error state. In an exemplary embodiment one bit will indicate the error state, and an additional bit will be set that independently blocks load responses. In an additional embodiment, as part of the recovery process load operations from the CPU 102 are allowed to complete successfully while DMA operations initiated from the adapter are still blocked by the I/O hub 112.

As indicated above, the device table 211 comprises one device table entry 210 for each of the adapters 110 in communication with the I/O hub 112 as described above. In exemplary embodiments, the device table entry 210 allocates one or more bits to indicate the state of the function of the adapter 110 associated with one of the device table entries 210. At block 406 the I/O hub 112 begins to block any further operations related to the function 220 from the adapter 110 which was flagged as being in an error state at block 404. In an exemplary embodiment, any further operations, including but not limited to DMA operations, MSI, and Load responses, are ignored by the I/O hub 112. At block 408, the I/O hub 112 writes information related to the error in the PCI error log 318. The I/O hub 112 uses the PCI error log base 316, which, as described above, is an address in the system memory 104 where the PCI error log 318 begins, and writes to the system memory 104 at an offset from the PCI error log base 316 based on the adapter 110 which is in error. For example, if a third adapter 110 (e.g. the adapter associated with device table entry 210 at index 3) connected to the I/O hub 112 is found to be in an error state, the I/O hub 112 will write the error in the PCI error log 318 by starting at the PCI error log base 316, and then advancing X*Y*Z bits wherein X is the number of the adapter 110, in this case 3, Y is the number of words allocated for each PCI error log record 320, in this case 8, and Z is the number of bits in each word, in this case 32.

Figure 5:
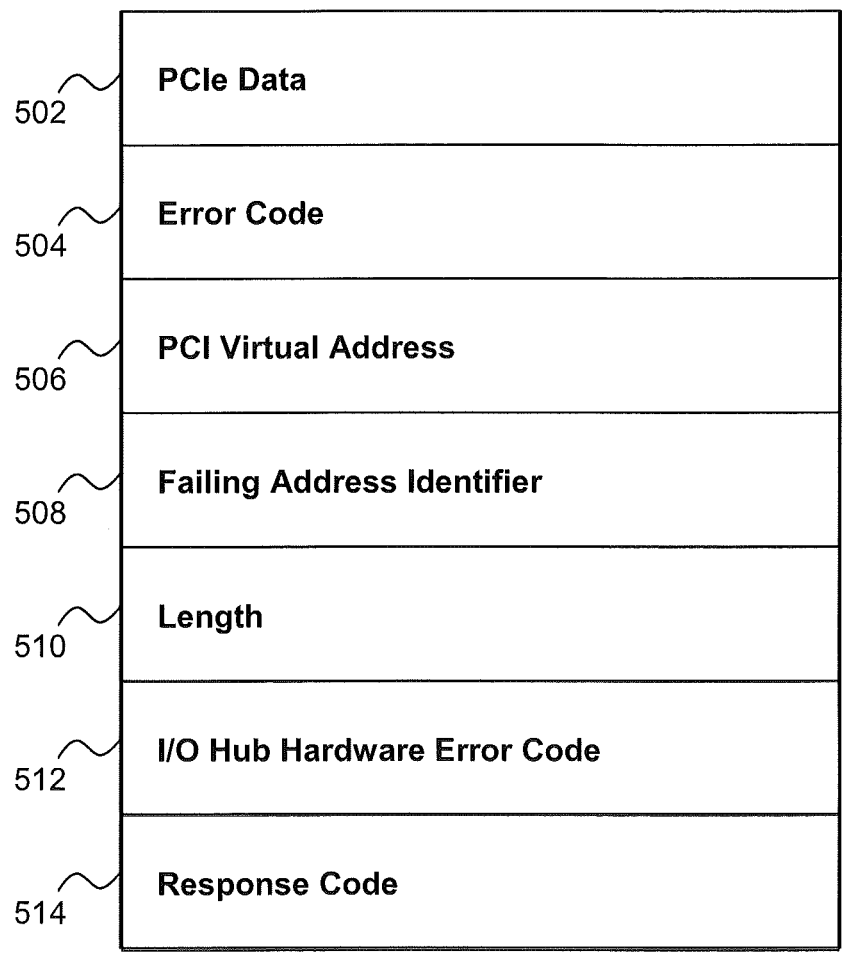
FIG. 5 depicts a block diagram of a PCIe error log record that may be implemented by an exemplary embodiment.

FIG. 5 shows one embodiment of the PCI error log record 320. The PCI error log record 320 is made up of multiple entries. The PCI error log record 320 may include the PCI data 502 received in the failing operation, the length 510 of the operation and an indication whether the operation was a write or a read. The PCI error log record 320 also includes a hardware error code 504 for indicating the type of error detected by the I/O hub 112. These errors can include specific error conditions detected by the I/O hub 112 including but not limited to such errors as the PCI virtual address is out of range, address translation error, interrupt processing error and a PCI fatal error. The PCI error log record 320 also includes a PCI virtual address 506 of the adapter 110 which indicates the address that was being processed by the I/O hub 112 when the error was detected. The PCI error log record 320 further includes a failing address identifier 508 (FAID) that indicates whether the failing operation was a DMA, an MSI or in the case of an address translation error, the level of translation that encountered the error. The error log record 320 may also include an error code 512 identifying a particular hardware error within the I/O hub 112, and/or a response code 514 for errors encountered on the I/O-to-memory bus 120. Although the PCI error log record 320 has been described as having a series of fields, it will be understood that the PCI error log record 320 could be made up of any combination of flags and fields including additional fields or one or more fields as described above for the purpose of indicating the type of error detected by the I/O hub 112 and related to the adapter 110.

Returning to FIG. 4, at block 410, the I/O hub 112 sets a flag in the PCI error vector 312. The PCI error vector 312 comprises a single bit for each of the adapters 110. The I/O hub 112 uses the PCI error vector base address 310, which, as described above, is an address in the system memory 104 where the PCI error vector 312 begins, and writes to the system memory 104 at an offset from the PCI error vector base 310 based on which of the adapters 110 is in error. For example, if the third adapter 110 (e.g. the adapter corresponding to device table entry 210 at index 3) connected to the I/O hub 112 is found to be in an error state, the I/O hub 112 will write the error in the PCI error vector 312 by starting at the address in the PCI error vector base 310, and then advancing X bits wherein X is the number of the adapter 110, in this case 3. The PCI error vector 312 is used by the monitoring thread 304 as an efficient method of detecting that an error exists and identifying the adapter that caused the error. At block 412, the I/O hub 112 generates an interrupt request, for example by setting a bit in the attention vector 306 of the CPU 102. The interrupt causes the CPU 102 to execute the monitoring thread 304. At block 414 the monitoring thread 304 checks the flags in the PCI error vector 312 to determine which of the adapters 110 is in an error state. Using the offset in the PCI error vector base 310, and the PCI error log base address 316, the monitoring thread 304 looks up the corresponding PCI error log record 320 in the PCI error log 318. The monitoring thread 304 then determines the type of error based on the information in the PCI error log record 320 and notifies the application 322 that an error exists. One way of managing communications between the adapters 110 and the application 322 is described in commonly assigned U.S. patent application Ser. No. 12/821,191, entitled "Managing Processing Associated with Hardware Events" filed on Jun. 17, 2010, which is incorporated by reference herein in its entirety. The application 322 uses its error handling logic to process the error message. Although the PCI error vector base address 310 and the PCI error log base address 316 are described as being part of the I/O hub 112, it will be understood that these fields can be stored in the system memory 104 (FIG. 1), or a second copy of the PCI error vector base address 310 and the PCI error log base address 316 may be stored in the monitoring thread 304.

Figure 6:
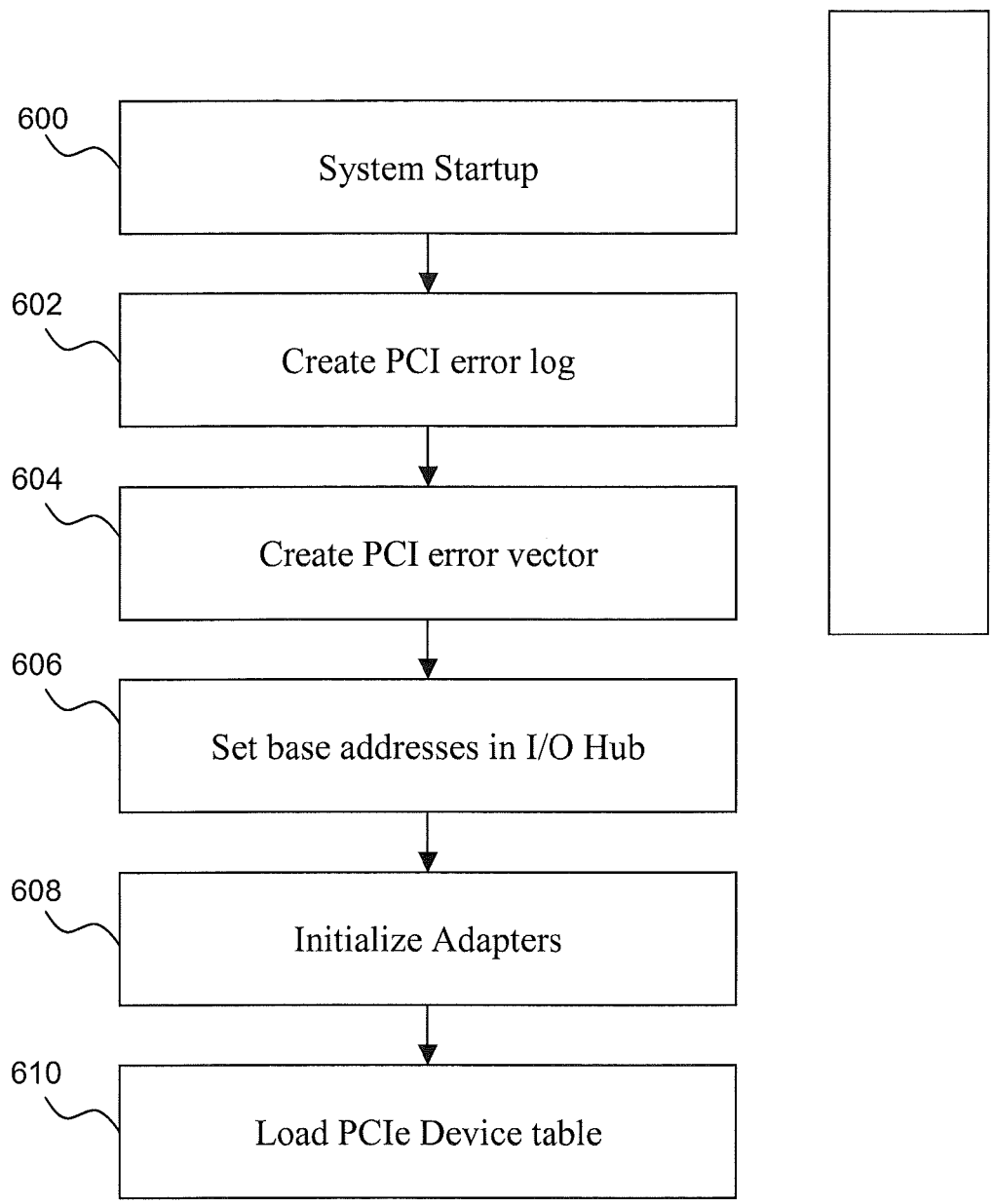
FIG. 6 depicts a process flow of the initialization of a scalable PCIe function level error detection, isolation, and reporting system that may be implemented by an exemplary embodiment.

Turning now to FIG. 6 a process for initializing the system will be described. At block 600 the computing environment 100 is started (e.g. a system boot up). At block 602, the PCI error log 318 is initialized. The initialization process sets aside a contiguous block of system memory 104 large enough to hold one record for each of the adapters 110 that is coupled to the I/O-to-memory bus 120. In alternate embodiments, additional memory space may be allocated to support the addition of one or more adapters 110 at runtime. At block 604 the PCI error vector 312 is initialized. The PCI error vector bits 314 are initialized to indicate that there are no errors in the adapters 110. At block 606, the PCI error log base address 316, and PCI error vector base address 310 are initialized by setting the values in the respective fields to the address of the first byte of memory allocated for the PCI error log 318 and the PCI error vector 312 respectively. At block 608 the adapters 110 in the computing environment 100 are initialized and registered with the I/O hub 112. At block 610, software initializes the device table entry 210 for each of the adapters 110. This includes initializing the error identifier fields 302 and 303 of a device table entry 210 to indicate that the corresponding adapter 110 is not in the error state.

For clarity the adapters 110 have been described as having only a single function, it will be understood, however, that an adapter 110 may comprise a plurality of functions wherein each function is treated like an individual adapter as described above by using one entry per function in the I/O hub 112 and in the PCI error log 318 and PCI error vector 312. In addition, although the adapters 110 have been described as PCIe adapters and functions, it will be understood that the present invention will apply equally to PCI adapters and functions as well as other I/O adapters and architectures as are known in the art.

Technical effects and benefits include a quick and efficient mechanism for notifying applications of errors occurring at the adapters. In addition, the present invention prevents the propagation of corrupt data by stopping all outbound transactions from exiting the I/O hub without requiring modifications of the adapters and maintaining the PCIe standards. Additional benefits include a compact mechanism, one bit per adapter, for flagging errors of an adapter in the I/O hub. A further benefit of the present invention is that an error in the adapter can be identified by a monitoring thread using only an array of memory consisting of one bit per adapter. Yet another benefit of the present invention is that the cause of the error can be identified and sent to the application so that proper action can be taken by the application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In exemplary embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for implementing scalable input/output (I/O) function level error detection, isolation, and reporting, the system comprising:
    an I/O hub communicatively coupled to a computer processor, system memory and at least one I/O adapter, the at least one I/O adapter including a function and the I/O hub including logic for implementing a method, the method comprising:
    detecting an error in a communication initiated between the function and the system memory, the communication including an I/O request from an application;
    preventing future communication between the function and the system memory in response to the detecting;
    notifying the application that the error in communication occurred in response to the detecting; and
    creating an error entry in the system memory in response to the detecting, the error entry identifying the function in error and a specific error condition detected by the I/O hub,
    wherein the error entry is written to a location in the system memory specified as an offset from an error log base address, and wherein the offset is based on an identification number of the at least one I/O adapter.

2. The system of claim 1, wherein the I/O hub is communicatively coupled to the computer processor and the system memory via a Peripheral Component Interconnect Express (PCIe) bus.

3. The system of claim 1, wherein the I/O hub sets a flag in the system memory indicating that the one of the one or more I/O adapters is in an error state in response to the detecting, and sends an interrupt to the computer processor, the interrupt causing a monitoring thread to initialize and check the status of the flag.

4. The system of claim 3 wherein the notifying is responsive to the monitoring thread detecting that the flag indicates that the I/O adapter is in an error state.

5. The system of claim 1 wherein one or more bits are set in the I/O hub to indicate that one of the one or more I/O adapters has entered an error state in response to the detecting.

6. The system of claim 5 wherein the I/O hub prevents the future communication between the function and the system memory in response to checking the single bit before processing a transaction from the I/O adapter.

7. The system of claim 1, wherein the detected error comprises at least one of:
    receiving an address outside of a range registered for the at least one I/O adapter;
    an address translation error;
    an interrupt processing error; and
    a Peripheral Component Interconnect (PCI) fatal error.

8. The system of claim 1, wherein the offset is further based on a product of the identification number of the at least one I/O adapter, a number of words allocated for each of a plurality of error entries in the system memory, and a number of bits in each word.

9. The system of claim 1, wherein the error entry further identifies:
    data received during the error in communication;
    a length of the communication in error;
    an indication of whether the communication in error is a read operation or a write operation; and
    a virtual address of the at least one I/O adapter which indicates an address being processed by the I/O hub when the error is detected.

10. A computer program product for implementing scalable input/output (I/O) function level error detection, isolation, and reporting, the computer program product comprising:
    a non-transitory storage medium readable by a processing circuit and storing instructions for execution by the processing circuit for performing a method comprising:
    detecting, via an I/O hub, an error in a communication initiated between a function and a system memory, the communication including an I/O request from an application, and the function executing on an I/O adapter;
    preventing future communication between the function and the system memory in response to the detecting;
    notifying the application that the error in communication occurred in response to the detecting; and
    creating an error entry in the system memory in response to the detecting, the error entry identifying the function in error and a specific error condition detected by the I/O hub,
    wherein the error entry is written to a location in the system memory specified as an offset from an error log base address, and wherein the offset is based on an identification number of the I/O adapter.

11. The computer program product of claim 10, wherein the I/O adapter is a Peripheral Component Interconnect Express (PCIe) adapter.

12. The computer program product of claim 10, wherein the I/O hub sets a flag in the system memory indicating that one of the one or more I/O adapters is in an error state in response to the detecting, and sends an interrupt to a computer processor, the interrupt causing a monitoring thread to initialize and check the status of the flag.

13. The computer program product of claim 12 wherein the notifying is responsive to the monitoring thread detecting that the flag indicates that the I/O adapter is in an error state.

14. The computer program product of claim 10 wherein one or more bits are set in the I/O hub to indicate that one of the one or more I/O adapters has entered an error state in response to the detecting.

15. The computer program product of claim 14 wherein the I/O hub prevents the future communication between the function and the system memory in response to checking the single bit before processing a transaction from the I/O adapter.

16. The computer program product of claim 10, wherein the detected error comprises at least one of:
    receiving an address outside of a range registered for the I/O adapter;
    an address translation error;
    an interrupt processing error; and
    a Peripheral Component Interconnect (PCI) fatal error.

17. The computer program product of claim 10, wherein the offset is further based on a product of the identification number of the I/O adapter, a number of words allocated for each of a plurality of error entries in the system memory, and a number of bits in each word.

18. The computer program product of claim 10, wherein the error entry further identifies:
    data received during the error in communication;
    a length of the communication in error;
    an indication of whether the communication in error is a read operation or a write operation; and
    a virtual address of the I/O adapter which indicates an address being processed by the I/O hub when the error is detected.

* * * * *